350-433

XR  3,596,101

United State

[11] 3,596,101

| [72] | Inventors | Atsushi Someya<br>Tokyo;<br>Masayuki Miyasaki, Fujisawa-shi, both of, Japan |
|---|---|---|
| [21] | Appl. No. | 874,229 |
| [22] | Filed | Nov. 5, 1969 |
| [45] | Patented | July 27, 1971 |
| [73] | Assignee | Canon Inc.<br>Tokyo, Japan |

[54] OPTICAL SYSTEMS FOR AUTOMATIC FOCUSING APPARATUS
5 Claims, 4 Drawing Figs.

[52] U.S. Cl..................................................... 250/204, 250/220 R, 350/41, 350/190, 352/140
[51] Int. Cl....................................................... G01j 1/36
[50] Field of Search............................................ 250/201, 220, 204; 350/41, 190; 352/140

[56] References Cited
UNITED STATES PATENTS
3,511,156  11/1965  Larks ........................ 250/201 UX
OTHER REFERENCES
German Printed Application: 1,103,050, Hock 3-23-1961

*Primary Examiner*—James W. Lawrence
*Assistant Examiner*—C. M. Leedom
*Attorney*—McGlew and Toren ABSTRACT: Improvement of an apparatus to form an image of an object by an objective lens onto photoelectric element surfaces and to effect the function of automatic focusing utilizing the difference between the outputs of photoelectric element when the image is in focus and when the image is defocused.

PATENTED JUL 27 1971　　　　　　　　　　3,596,101

INVENTOR
ATSUSHI SOMEYA
MASAYUKI MIYASAKI
BY McGlew & Toren
ATTORNEY

OPTICAL SYSTEMS FOR AUTOMATIC FOCUSING APPARATUS

The present invention relates to an improvement of an apparatus to form the image of an object by an objective lens onto photoelectric element surfaces and to effect the function of automatic focusing utilizing the difference between the outputs of photoelectric element when the image is in focus and when the image is out of focus, and particularly an improvement of an apparatus to form the image of an object on the two photoelectric element surfaces which are divided into an upper surface and a lower surface by an image-splitting line, and to control the automatic focusing mechanism by utilizing such characteristics that the difference in the outputs of these two elements becomes zero when the images are in focus, the upper image and lower image coming to alignment, while there will be a difference in the outputs of these two elements when defocused, the upper image not uniting with the upper image.

The present invention shall be described referring to the attached drawings in which.

Figure 1:
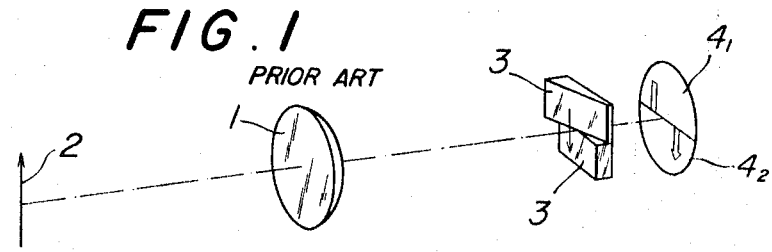
FIG. 1 is an oblique view showing an example of the optical system for this kind of apparatus of the conventional type.

FIG. 1 shows an example of this kind of apparatus of the conventional type, wherein the image of an object 2 is formed on a split-image prism 3 by an objective lens 1, and at the same time the image is formed on two photoelectric element surfaces $4_1$, $4_2$, the upper and lower images, which are imaged behind the split-image prism having an image-splitting line held therebetween, when the image of the object is properly focused on the split-image prism 3, the images on the two photoelectric element surfaces $4_1$, $4_2$ are aligned up and down, and when defocused the upper image and the lower image are deviated from each other to left and right, generating a difference between the outputs of the two elements, thus the control of automatic focusing is effected utilizing such characteristics.

Figure 3:
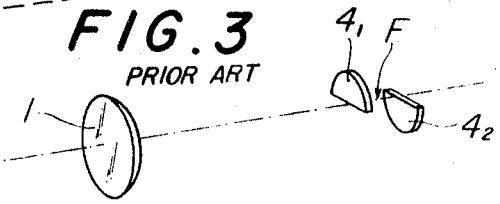
FIG. 3 is an oblique view showing another example of this kind of apparatus of the conventional type.

In the example shown in FIG. 3, instead of using a split-image prism, two photoelectric elements $4_1$, $4_2$, forming an upper half and a lower half are placed in front of and in the rear of, respectively, a supposed focus F, sandwiching the supposed focus therebetween, being separated therefrom with an equal distance, and the control of automatic focusing is effected utilizing the difference in outputs of the two elements which takes place due to the disalignment of the images formed on the front element $4_1$ and the rear element $4_2$ when actual focus through an objective lens 1 comes off the supposed focus F.

In an apparatus utilizing such an optical system of an upper and lower split-image type as shown above, there are such shortcomings that unevenness or irregularity will take place in the intensity of illumination between the upper element and the lower element because of the irregularity of brilliance (intensity) caused by an effect of skylight or by the presence of extraordinarily bright spot. Therefore, there will be such cases that even when the image is in focus, the difference in outputs of both elements will not become zero, thus lowering the accuracy in automatic focusing.

The present invention is intended to eliminate such shortcomings, and is characterized by providing a cylindrical lens having a cylindrical axis which is perpendicular to the dividing plane between the two elements, upper and lower, in the above-mentioned apparatus, and having said cylindrical lens contained in an objective lens.

Figure 2:
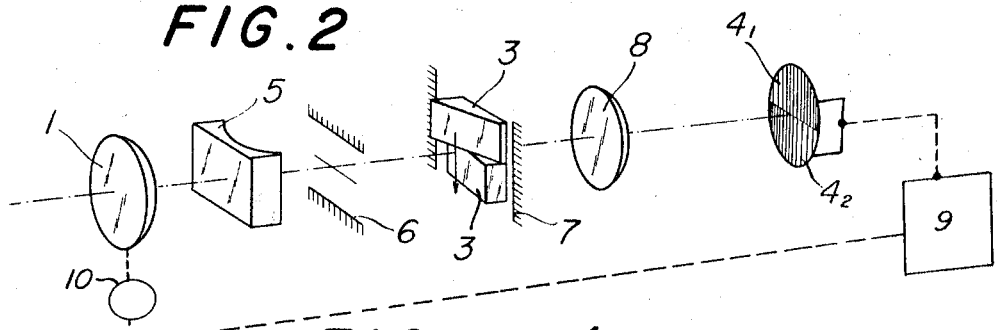
FIG. 2 is an oblique view showing an optical system of the apparatus shown in FIG. 1 to which the present invention is applied.

FIG. 2 shows an apparatus made by providing certain improvements to the arrangement shown in FIG. 1, wherein a cylindrical lens 5 is positioned in the light path of an objective lens 1 so that the axis of the cylinder is perpendicular to the image-splitting line which splits the image to up and down. In the drawing 6 and 7 are masks for limiting the extent of distance measuring. In this apparatus the image of an object through the objective lens 1 and the cylindrical lens 5 is bifocused into two images: one is formed in lateral direction both by the objective lens 1 and the cylindrical lens 5 and the other is formed in vertical direction only by the objective lens 1 at the position of mask 6 and at the position of mask 7. At the position where the image in vertical direction is formed, a split-image prism 3 is so positioned so that the axis of the cylinder of the cylindrical lens 5 is perpendicular to the image-splitting line of the split-image prism 3. The image in the vertical direction is further formed on the upper photoelectric element $4_1$ and lower photoelectric element $4_2$ through a relay lens 8 which is placed behind the split-image prism 3. These two elements are so positioned close to each other as having holding therebetween a conjugate image line of the split-image line of the split-image prism 3 through the relay lens 8. In the automatic focusing mechanism, the output form the photoelectric elements 41, 42 is collected in a member 9 which compares the outputs, and, if necessary, a signal is conveyed from the member 9 to a device 10 which cooperates with the objective lens for adjusting the focus of the optical system.

In the above mentioned apparatus, by inserting the cylindrical lens 5 the distribution of the brightness in the vertical direction of an object is integrated and normalized on the split-image prism 3, thus being made almost uniform, and the distribution or variation of illumination will remain on the photoelectric elements only in the horizontal direction. By forming the image on the photoelectric elements through the relay lens 8, the difference in output of the upper and lower elements will not be zero in the event the upper image is not aligned with the lower image having the image-splitting line as their boundary line, but the difference in output of the two elements becomes perfectly zero when the upper and lower images are aligned together. Thus the function of controlling the automatic together. Thus the function of controlling the automatic focusing mechanism will be of high accuracy.

Figure 4:
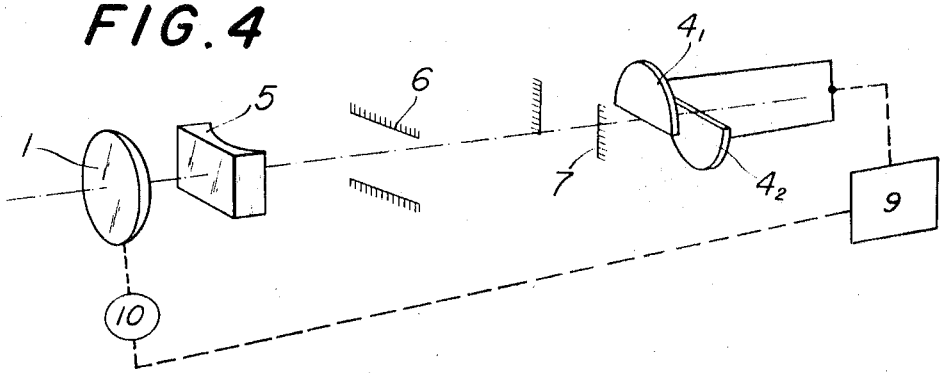
FIG. 4 is an oblique view showing an example wherein the present invention is applied to the example shown in FIG. 3.

FIG. 4 shows an example where present invention is applied to the apparatus of the type shown in FIG. 3, wherein a cylindrical lens 5 is added to the light path of an object lens 1. The image of an object in a vertical direction through said both lenses is formed on the two photoelectric elements $4_1$, $4_2$ which are so positioned respectively at a same distance from a supposed focus in a vertical direction that they are arranged in front of and in the rear of, respectively, the supposed focus, sandwiching the same. Then the difference in outputs of the two elements are detected in the automatic focusing mechanism composed of the member 9 and the device 10. The both elements are positioned close to each other having, as their boundary line, the plane which contains the optical axis and is perpendicular to the axis of cylinder of the cylindrical lens 5. By such an arrangement, the irregularity in brightness in the vertical direction depending on the kind of object which constitutes shortcomings of the apparatus in FIG. 3, particularly the effect of skylight, etc. is eliminated, thus the difference in output of the two elements can be accurately detected.

As been explained above by using the arrangement of the present invention the formation of irregularity in the intensity of illumination, which has been the cause for lowering the accuracy in this kind of apparatus of conventional type, is compulsorily eliminated, thus enhancing the accuracy in measurement.

What we claim is:

1. An optical system for automatic focusing apparatus comprising an objective lens for forming the image of an object, a pair of closely spaced photoelectric elements in alignment with said objective lens and each having an image-receiving surface extending transversely of the axis between said objective lens and said photoelectric elements and an image-splitting line extending transversely in the same direction as said image-receiving surfaces and defining a line of separation between said photoelectric elements which said photoelectric elements extending in opposite directions from the image-splitting line, an automatic focusing mechanism in operative communication with said photoelectric elements and said objective lens and being arranged to receive the outputs from the image-receiving surfaces of said photoelectric elements and when a difference in the output is present said automatic focusing mechanism adjusts said objective lens for bringing the image into focus, wherein the improvement comprises a cylindrical lens positioned between said objective lens and said photoelectric elements with its cylindrical axis being perpendicular to the direction of the image-splitting line between said photoelectric elements.

2. An optical system for automatic focusing apparatus comprising an objective lens for forming the image of an object, a pair of photoelectric elements in alignment with said objective lens and each having an image-receiving surface extending transversely of the axis between said objective lens and said photoelectric element with the image-receiving surfaces being disposed in the same plane and an image-splitting line defining a common line of separation between said elements with the image-receiving surfaces of said photoelectric elements extending in the opposite direction from the image-splitting line, split-image prisms positioned between and in alignment with said objective lens and said photoelectric elements and being arranged so that the image of the object is formed at the surface of said split-image prisms and is formed also on the surfaces of said photoelectric elements, an automatic focusing mechanism in operative communication with said photoelectric elements and said objective lens and being arranged to receive the outputs from the image-receiving surfaces of said photoelectric elements and when a difference in the outputs from said photoelectric elements is present said automatic focusing mechanism adjusts said objective lens for bringing the image into focus on the image-receiving surfaces of said photoelectric elements, wherein the improvement comprises a cylindrical lens positioned between and in alignment with said objective lens and said photoelectric elements with the cylindrical axis of said cylindrical lens being disposed perpendicularly to the direction of the image-splitting line between said photoelectric elements, and a relay lens positioned between and in alignment with said split-image prisms and said photoelectric elements and being arranged for forming the image of the object on the image-receiving surfaces of the photoelectric elements.

3. An optical system, as set forth in claim 2, wherein the image-splitting line between said photoelectric elements is positioned horizontally and one of said photoelectric elements extends upwardly from said image-splitting line and the other photoelectric element extends downwardly from the image-splitting line.

4. An optical system for automatic focusing apparatus comprising an objective lens, a pair of closely spaced photoelectric elements spaced from and in alignment with said objective lens and each having an image-receiving surface extending transversely of the axis between said objective lens and said photoelectric elements and an image-splitting line defining a line of separation between said photoelectric elements with said photoelectric elements extending in opposite directions from the image-splitting line and with said photoelectric elements disposed in spaced parallel planes extending transversely of the axis between said objective lens and said photoelectric elements, a cylindrical lens arranged between and in alignment with said objective lens and said photoelectric elements for forming an image of an object, said photoelectric elements each being spaced the same distance from a supposed focal point on the axis through said objective lens cylindrical lens and photoelectric elements whereby the supposed focal point is equally distantly sandwiched between said photoelectric elements, an automatic focusing mechanism in operative communication with said photoelectric elements and said objective lens and arranged to receive the outputs from the image-receiving surfaces of said photoelectric elements and when a difference in the outputs is present between said photoelectric elements said automatic focusing mechanism adjusts said objective lens for bringing the image into focus, and the cylindrical axis of said cylindrical lens being disposed perpendicularly to the image-splitting line between said photoelectric elements.

5. An optical system as set forth in claim 4, wherein the image-splitting line between said photoelectric elements being disposed horizontally and one of said photoelectric elements extending vertically upwardly from the image-splitting line and the other said photoelectric element extending vertically downwardly from the image-splitting line.